March 20, 1962  M. M. SAUERS ETAL  3,025,599
POWER DRIVEN SLITTING SHEARS
Filed Jan. 23, 1961

INVENTORS
Myrl M. Sauers.
Clinton B. McElheny.

3,025,599
POWER DRIVEN SLITTING SHEARS
Myrl M. Sauers and Clinton B. McElheny, both of 1680 Tartar Lane, Compton, Calif.
Filed Jan. 23, 1961, Ser. No. 84,423
2 Claims. (Cl. 30—228)

The present invention relates to power driven shears for slitting sheet metal, tubing, channel iron or the like.

An object of the present invention is to provide a power driven shears which lends itself to rapid and efficient cutting or slitting of sheet metal in any form with ease and facility, and without the expenditure of effort by the operator.

Another object of the present invention is to provide a metal shears of compact size, one driven by a portable power drill which is easily attached to and detached from the shears, one which has an extremely rapid shearing action, one without excessive vibration when in use, and one which may be manufactured at reasonable cost.

A further object of the present invention is to provide a metal shears which is of sturdy construction and of long life characteristics, and one which is easily disassembled for sharpening and as easily reassembled.

Figure 1:
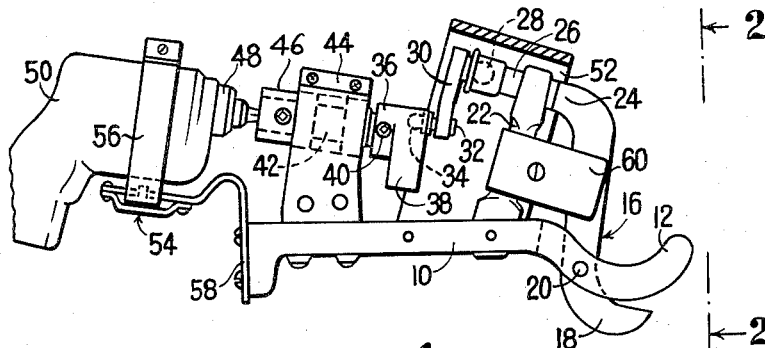
Figure 2:
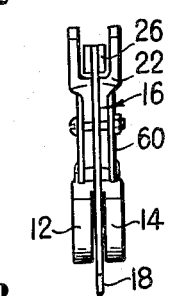
Figure 3:
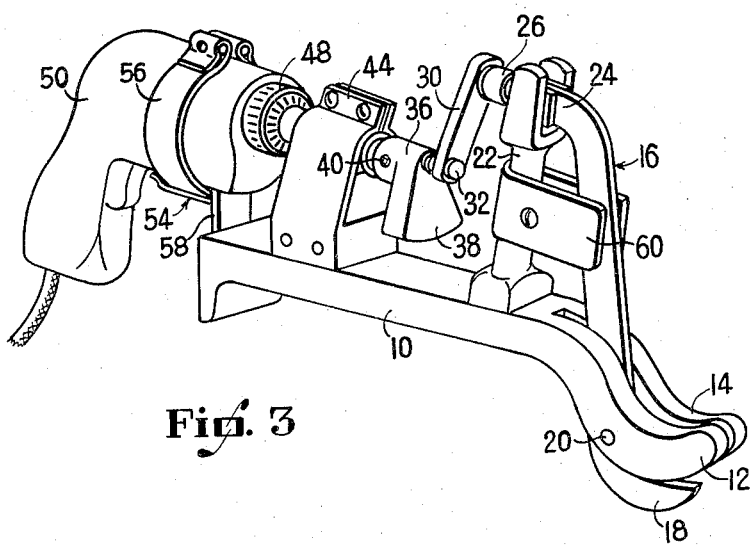
Figure 4:
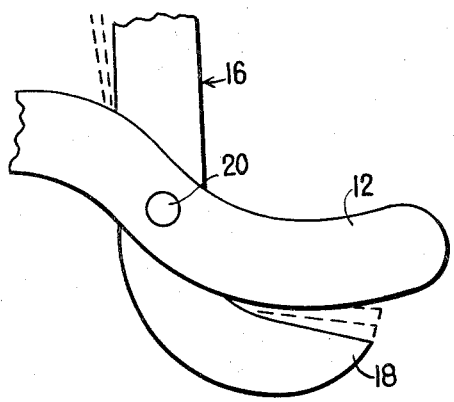

In considering the following description, reference should be made to the attached drawing, in which:

FIGURE 1 is a side elevational view of the shears of the present invention, shown with a portable power drill attached, FIGURE 2 is a view on line 2—2 of FIGURE 1 with the drill removed, FIGURE 3 is a perspective view of the assembly shown in FIGURE 1, and FIGURE 4 is an enlarged view of the blades, the dotted lines indicating the shearing movement of the movable blade.

With reference to the drawing in detail, the shears consists in an elongated base 10 having a pair of fixed jaws or blades 12 and 14, projecting from one end and formed integrally therewith.

The blades 12 and 14 are arcuately curved and a movable blade 16 has an end portion 18 conformably shaped to the blades 14 and 16. The portion 18 is movable into and out of the space between the fixed blades 12 and 14, as shown by dotted lines in FIGURE 4. A pivot pin 20 connects the blade portion 18 to the fixed blades 12 and 14 for pivotal movement about the pin 20 as an axis transversely of the blades 12 and 14.

A post 22 rises from the base 10 adjacent the juncture of the base 10 with the blades 12 and 14. The upper end of the post 22 is bifurcated and provides a guide for the other end portion 24 of the blade 16.

A connector element 26, having a ball socket in one end, is bifurcated at the other end and riveted to the end part of the blade end portion 24.

A ball 28, shown only in dotted lines in FIGURE 1, is seated in the socket of the connector element 26 and is fixedly carried by the free end of a crank arm 30 which has its other end provided with a pin 32 which has a ball on one end, the ball being shown in dotted lines in FIGURE 1 and indicated by the numeral 34.

The ball 34 is seated in a socket provided in an eccentric body 36 having a counter balance 38 formed as a part thereof. The body 36 is secured by suitable means such as a setscrew 40 to one end of a driven shaft 42 journaled in suitable bearings secured in the upper end of a bearing block 44 carried by the base 10.

A coupling 46 is secured to the other end of the shaft 42 and is attachable to the chuck 48 of an electric power drill 50. Preferably, the coupling 46 is of the flexible type such as a tapered sided square head received in a square bore in the coupling body, although it is contemplated that various other coupling means could do as well to connect the drill 50 to the shaft 42.

A shield 52 extends over the crank pin 32 and arm 30. A clamp 54 adjustably supports the drill 50 on the end of the base 10 remote from the blades 12 and 14. The clamp 54 includes a split ring 56 slidable in a slot provided in an extension member 58 bolted to the adjacent end of the base 10, as shown in FIGURE 1.

A U-shaped guard 60 is clamped on the post 22 and has its legs on each side of the blade 16 to serve as guides for the midpart of the blade 16.

The blades 12, 14 and 16 are tapered along their cutting edges so that the metal sheet being cut will not ride up nor cling to the blade 16. This form of cutting edge is conventional and not specifically shown in detail as not forming a part of the present invention except as it improves the slitting action of the tool.

In use, with the drill operating, the crank pin 32 and arm 30 cause the blade end portion 24 to move up and down rapidly in the upper end of the post 22. Because of the relatively long length of the part of the blade 16 on that side of the pin 20 and the short length of the portion 18, the portion 18 is moved in very short cutting movements but with extremely powerful strokes. This results in a powerful cutting action at a rate of speed determined by the speed of rotation of the drill chuck, normally many hundred times a minute.

Circles, arcs, curves and other configurations are easily slit or cut in sheet metal or tubing by the use of the tool of the present invention.

While only a single embodiment of the present invention has been shown and described, other embodiments are contemplated and numerous changes and modifications may be made in the invention without departing from the spirit thereof as set forth in the following claims.

What is claimed is:

1. A power driven slitting shears comprising an elongated base element, a pair of fixed blades arranged in lateral spaced relation projecting from one end of said base, a post rising from said base adjacent said one end of said base, a movable blade having the portion adjacent one end disposed between said fixed blades, said movable blade being pivotally connected to said fixed blades for movement about an axis transverse of said fixed blades from the position in which said one end portion is between said fixed blades to a position in which said portion is exteriorly of said fixed blades, the other end portion of said movable blade extending slidably through the upper end of said post, a driven shaft supported on said base, a crank pin carried by said shaft, and a crank arm operatively connecting said crank pin to said other end portion of said movable blade for effecting movement of said movable blade responsive to rotating of said shaft.

2. A power driven slitting shears comprising an elongated base element, a pair of fixed blades arranged in lateral spaced relation projecting from one end of said base, a post rising from said base adjacent said one end of said base, a movable blade having the portion adjacent one end disposed between said fixed blades, said movable blade being pivotally connected to said fixed blades for movement about an axis transverse of said fixed blades from the position in which said one end portion is between said fixed blades to a position in which said portion is exteriorly of said fixed blades, the other end portion of said movable blade extending slidably through the upper end of said post, a driven shaft supported on said base, a crank pin carried by said shaft, a crank arm operatively connecting said crank pin to said other end portion of said movable blade for effecting movement of said movable blade responsive to rotating of said shaft, and clamp means on the other end of said base adapted to support a portable power drill when the chuck of the latter is operatively connected to said shaft.

References Cited in the file of this patent

UNITED STATES PATENTS

| | | |
|---|---|---|
| 1,762,392 | Gray | June 10, 1930 |
| 2,256,779 | McHenry | Sept. 23, 1941 |
| 2,455,009 | Hood | Nov. 30, 1948 |
| 2,529,171 | Menser | Nov. 7, 1950 |
| 2,635,335 | James | Apr. 21, 1953 |
| 2,840,904 | Hutchins | July 1, 1958 |

FOREIGN PATENTS

| | | |
|---|---|---|
| 17,279 | Switzerland | Jan. 24, 1899 |